United States Patent [19]

Groves

[11] Patent Number: 5,222,225
[45] Date of Patent: Jun. 22, 1993

[54] APPARATUS FOR PROCESSING CHARACTER STRING MOVES IN A DATA PROCESSING SYSTEM

[75] Inventor: Randall D. Groves, Austin, Tex.

[73] Assignee: International Business Machines Corporation, Armonk, N.Y.

[21] Appl. No.: 742,209

[22] Filed: Aug. 6, 1991

Related U.S. Application Data

[63] Continuation of Ser. No. 255,096, Oct. 7, 1988, abandoned.

[51] Int. Cl.⁵ .......................................... G06F 12/04
[52] U.S. Cl. .................................. 395/425; 364/244.5; 364/245.1; 364/246.3; 364/252.6; 364/259.5; 364/260.1; 364/DIG. 1
[58] Field of Search ... 395/400, 425, DIG. 1 MS File, 395/DIG. 2 MS File

[56] References Cited

U.S. PATENT DOCUMENTS

| | | | |
|---|---|---|---|
| 3,916,388 | 10/1975 | Shimp et al. | 340/172.5 |
| 4,109,310 | 8/1978 | England et al. | 395/400 |
| 4,520,439 | 5/1985 | Liepa | 395/425 |
| 4,542,456 | 9/1985 | Hill | 364/200 |
| 4,556,951 | 12/1985 | Dickman et al. | 364/900 |
| 4,575,795 | 3/1986 | Boothroyed et al. | 364/200 |
| 4,580,214 | 4/1986 | Kubo et al. | 395/425 |
| 4,598,358 | 7/1986 | Boddie et al. | 364/200 |
| 4,598,359 | 7/1986 | Boothroyed et al. | 364/200 |
| 4,625,295 | 11/1986 | Skinner | 364/900 |
| 4,663,732 | 5/1987 | Robinson | 364/900 |
| 4,860,192 | 8/1989 | Sachs et al. | 364/200 |
| 4,896,133 | 1/1990 | Methvin et al. | 340/146.2 |

FOREIGN PATENT DOCUMENTS 0130380 5/1984 European Pat. Off. .
88/04806 12/1986 World Int. Prop. O. .

OTHER PUBLICATIONS

Am29000 User's Manual, pp. 8-36.
IBM Technical Disclosure Bulletin, vol. 23, No. 5, Oct. 1980, pp. 2051-2056, "Scan Instruction".
IBM Technical Disclosure Bulletin, vol. 20, No. 8, Jan. 1978, pp. 2966-2971, "Variable Length Byte String Compare and Move Instruction".

*Primary Examiner*—Robert B. Harrell
*Assistant Examiner*—Ayni Mohamed
*Attorney, Agent, or Firm*—Thomas E. Tyson; Paul S. Drake

[57] ABSTRACT

In a data processing system configured to transfer data in words and an apparatus is provided for manipulating, in response to a single manipulation instruction, the contiguous variable length sequence of data stored in bytes including an instruction decoder for decoding a single manipulation instruction, a memory for storing data in words where each but word includes a plurality of bytes, a circuit responsive to the command signal from the instruction decoder to access a contiguous sequence of the bytes from the memory wherein the first byte of the sequence is not stored on a word boundary, and providing the byte sequence to a plurality of data processing registers wherein the first byte of the sequence is aligned with the first registered boundary. Additionally the apparatus includes the capability to provide the contiguous sequence to memory wherein the first byte of the sequence is not stored on a word boundary. The data sequence maybe specified by the number of bytes in the sequence or by a sequence terminating character.

3 Claims, 13 Drawing Sheets

| Opcode | RT | RA | RB |
|--------|----|----|----|

FIG. 9A

```
Loop:   ls    Rw, Rs, Rx        /* Load 32 bytes from source */
        ss    Rw, Rd, Rx        /* Store 32 bytes to destination */
        add   Rx, Rx + 32       /* Increment Index */
        sub   Rcnt, Rcnt - 1    /* Decrement Count */
        brnz  Loop              /* Branch if Rcnt not zero */
```

FIG. 9B

```
Loop:   ls    Rv, Rs1, Rx       /* Load 32 bytes from source 1 */
        ls    Rw, Rs2, Rx       /* Load 32 bytes from source 2 */
        add   Rx, Rx + 16       /* Increment Index */
        cmp   Rv, Rw            /* Compare 1st Words */
        brne  Miscompare        /* Branch if not equal */
        cmp   Rv + 1, Rw + 1    /* Compare 2nd Words */
        brne  Miscompare        /* Branch if not equal */
        cmp   Rv + 2, Rw + 2    /* Compare 3rd Words */
        brne  Miscompare        /* Branch if not equal */
        cmp   Rv + 3, Rw + 3    /* Compare 4th Words */
        brne  Miscompare        /* Branch if not equal */
        sub   Rcnt, Rcnt - 1    /* Decrement Count */
        brnz  Loop              /* Branch if Rcnt not zero */
```

FIG. 9C

```
Loop:   lscb  Rw, Rs, Rx        /* Load up to 32 bytes from source */
        ss    Rw, Rd, Rx        /* Store same bytes to destination */
        add   Rx, Rx + 32       /* Increment Index */
        brne  Loop              /* Branch if null not found */
```

FIG. 9D

APPARATUS FOR PROCESSING CHARACTER STRING MOVES IN A DATA PROCESSING SYSTEM

CROSS REFERENCE TO RELATED PATENT APPLICATION

This is a continuation of application Ser. No. 255,096 filed Oct. 7, 1988, now abandoned.

TECHNICAL FIELD

The present invention relates to a data processing system and more specifically to an apparatus for manipulating character strings in a data processing system.

BACKGROUND ART

Data processing systems access and manipulate data. A uniform amount of data is used for transferring and manipulating by the processor. This uniform amount is commonly the amount of data that is stored as a single unit in a memory. In modern data processing systems, this storage unit of data is termed a word and consist of 16 binary digits or bits. Words may also consist of 32, 48 or 64 bits depending on the characteristic of the specific data processing system. It is also desirable to break up words into smaller units such as bytes (8 bits), or nibbles (4 bits).

As data processing systems increase in capability, it is more advantageous to transfer large amounts of data as single units. However, it is also desirable to be able to access small amounts of data, such as bytes or nibbles, in data processing operations. The storage of data units such as words in memory requires the word be the smallest unit of data access. In other words, when one accesses data in memory, one must access a word at a time.

Characters strings are specific character data stored in a contiguous sequence. Commonly, a single character is less than a word in length, usually a byte. Since the length of character strings may vary, storing these variable length character strings only on word boundaries would result in the inefficient use of memory storage, i.e., the number of bytes in a specific character sequence are not always equal to a number of complete words of memory used. Therefore, it is desirable to access character sequences in memory that are not stored on word boundaries.

Since previous data processing systems have used 8 bit, 16 bit or 32 bit word lengths for storage and transfer units, the problem of efficient storage of character strings has not been of great interest. However, more modern data processing systems are increasing the number of bits in a storage or transfer unit. Therefore, the accessibility of bytes within data words is becoming more important.

The following prior art addresses character sequence processing. U.S. Pat. No. 4,556,951 entitled, "Central Processor With Instructions For Processing Sequences Of Characters", discuses a data processing system that has been adapted for processing character sequences and more specifically for examining character sequences for a predetermined characteristic.

U.S. Pat. No. 4,625,295 entitled, "Textual Comparison System For Locating Desired Character Strings And Delimiter Characters", discloses a data processing system including a text comparison circuit that is used to implement different search strategies for detecting predefined words in a text sequence.

The Advanced Micro Devices publication, Am29000 User's Manual, on page 8-36, lists a compare byte instruction which compares bytes of one register to corresponding bytes of another register.

IBM Technical Disclosure Bulletin, Volume 23, No. 5, October, 1980, pages 2051-2056 entitled "Scan Instruction" discloses an instruction for scanning through a character string from left to right in a byte by byte fashion. IBM Technical Disclosure Bulletin, Volume 20, No. 8, January, 1978, entitled "Variable Length Byte String Compare and Move Instruction" discloses an instruction for scanning a command string for a delimiter or for the first non-delimiter character.

The object of the present invention is to provide an apparatus for loading and storing character sequences consisting of data units smaller than the unit of data storage or data processing.

DISCLOSURE OF THE INVENTION

In accordance with the present invention and in a data processing system configured to transfer data in word units, an apparatus is provided for manipulating, in response to a single data manipulation instruction, a contiguous variable length sequence of data stored in units smaller than a word unit. The apparatus includes an instruction decoding circuit for decoding instructions and providing a command signal in response to the decoding of the single manipulation instruction. A memory circuit is provided for storing data as addressable words wherein each word includes a plurality of smaller data units. Additional circuitry is provided for accessing a contiguous sequence of the smaller data units in the memory circuit in response to a command signal from the instruction decoding circuit. The first of the smaller data units of the unit sequence stored in the data memory is not stored on a word boundary in the memory circuit. A circuit for providing the smaller data unit sequence to a plurality of data processing registers is also included. This circuit provides that the first smaller data unit in the sequence be aligned with the first registered boundary.

In the preferred embodiment this invention provides circuitry that performs the function of fetching character strings from byte locations in memory regardless of whether the bytes are stored on word boundaries. In this preferred embodiment, the invention includes a byte rotator circuit that arranges the locations of bytes within a single 32 bit word from memory. The byte rotator together with a byte merge circuit are used to merge bytes together into a sequence for storage in the general purpose registers in the data processing system. By providing the ability to rotate and merge bytes, this invention makes it possible to access bytes that are not stored on word boundaries in memory and provide them on the appropriate boundaries, i.e., register boundaries, to the data processing system. These bytes in sequence, make up character strings which can be manipulated as required in the general purpose registers.

The invention further includes a second byte rotator together with a second byte merge capability to store the sequence in memory on non-word boundaries.

This invention provides the capability to access and manipulate bytes inside of words, promoting the efficient storage of character strings in memory by not requiring that the character strings be stored on word boundaries while still enabling individual bytes of the character strings sequence to be manipulated as required by the application running in the data processing system.

BRIEF DESCRIPTION OF THE DRAWING

The novel feature believed characteristic of the invention is set forth in the appended claims. The invention itself, however, as well as other features and advantages thereof, will be best understood by reference to the following description of the best mode for caring out the invention, when read in conjunction with the accompanying figures, wherein:

BEST MODE FOR CARING OUT THE INVENTION

The objective of this invention is to provide an apparatus for fetching and storing character strings. Character strings, as used in the following discussion, include a sequence of characters specified by byte data. The length of the byte sequences can either be specified with a byte count or by a termination character at the end of a sequence.

Figure 1:
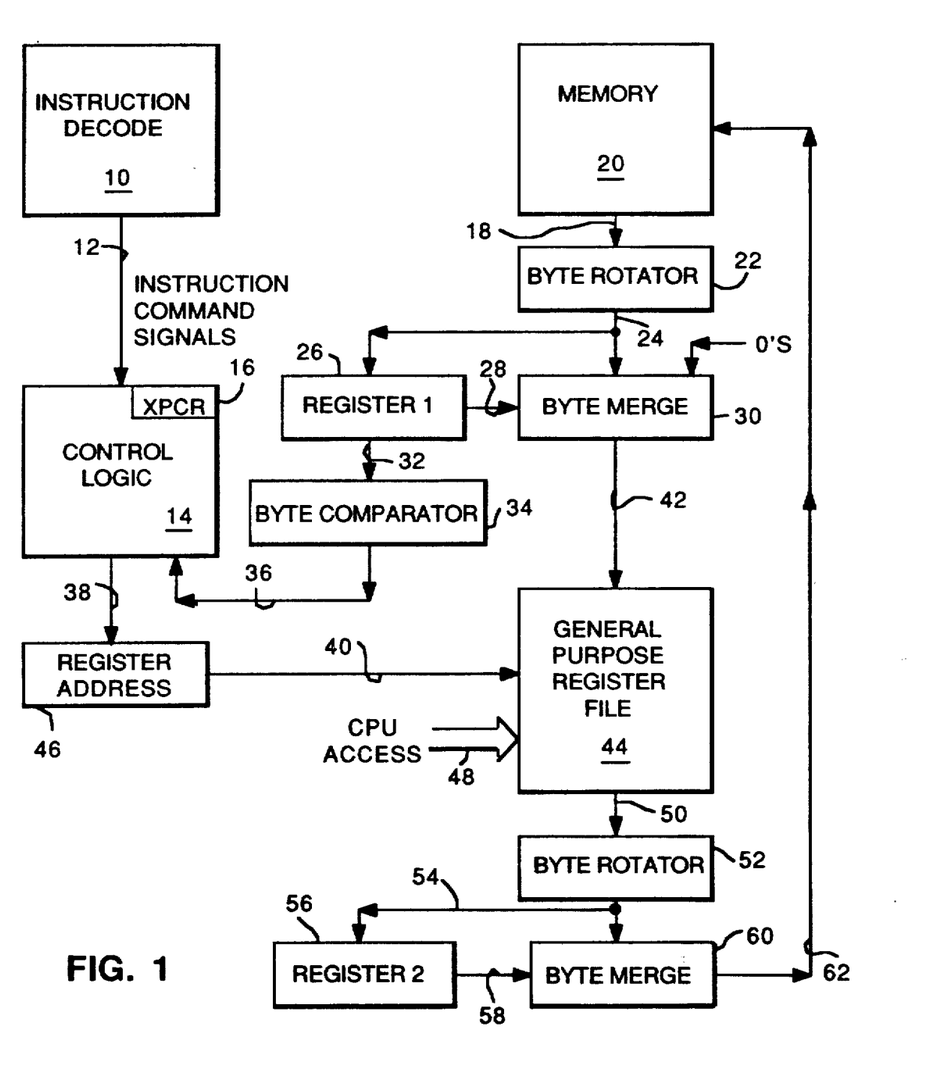
FIG. 1 is a block diagram illustrating the data flow of the invention.

FIG. 1 illustrates in block diagram form the data flow for a character string operation for this invention. Referring to FIG. 1, the instruction decode unit 10 decodes the string operation instruction and provides the command signal over lines 12 to control logic 14. Control logic 14 includes a fixed point count register 16 (XPCR). Control logic 14 provides the control signals to operate the different components of the invention such as the byte rotators 22 and 52, registers 26 and 56, byte merge logic 30 and 60 and the byte comparator 34. The control lines from the control logic 14 to these individual units has been omitted for the sake of simplicity. However, the operation of the control logic 14 with these individual components will be explained in flowchart form.

In FIG. 1, the invention includes a byte rotator 22 connected to a register 26 and byte merge logic 30. Byte rotator 22 is connected by bus 18 to a memory 20. In the following discussion, the memory 20 and the term cache will be used interchangeably since this invention can be used with both a data cache and a system memory. The memory 20 is addressable by words over the bus 18. In the preferred embodiment, the bus is 32 bits wide making the word length 4 bytes. A byte comparator 34 is connected to the register 26 to compare the individual bytes in the register 26 to a predetermine byte. Register 26 is connected to the byte rotator 22 by a bus 24 and also to the byte merge logic 30 by bus 28. Additionally the byte merge logic 30 is connected to receive zeros. The byte rotator 22, register 26, and byte merge logic 30 are one word in length, i.e., 32 bits.

The byte merge logic 30 is connected to the general purpose file 44. These are the general purpose registers for the central processing unit, CPU. The CPU is shown to have access to the general purpose registers file 44 by a bus 48. Each register in the general purpose register file 44 is 32 bits or one word in length. The general purpose file 44 is connected by a bus 50 to a second byte rotator 52. The second byte rotator is also connected to a the register 56 by a bus 54 and byte merge logic 60 by the same bus 54. The register 56 and byte merge logic 60 are connected by a bus 58. The output of the byte merge logic 60 is connected by bus 62 back to memory 20. As before, the capacity of the byte rotator 52, register 56, and byte merge 60 is one word in length.

The control logic 14 functions in the following manner. If the XPCR contains zero, then no operation is performed, otherwise, the following is computed by the control logic 14:

LSBS = 2 Least Significant bits of Starting Address
LSBX = 2 Least Significant bits of (XPCR1 - 1)
Note: All Mask and Mark fields are shown in descending order from Most Significant Byte to Least Significant Byte.

The control logic 14 compute the number of accesses required by the string instructions using the following formula:

Number of accesses required = 1 + (XPCR-1)/4 + (LSBS + LSBX)/4 where '/' indicates integer division.

TABLE 1

| | Load String | |
| LSBS | # of Bytes to Rotate Left | Load Byte Merge Mask |
| --- | --- | --- |
| 00 | 0 | 0000 |
| 01 | 1 | 0001 |
| 10 | 2 | 0011 |
| 11 | 3 | 0111 |

TABLE 2

| | Load String |
| LSBX | Last Access Mask Bits |
| --- | --- |
| 00 | 1000 |
| 01 | 1100 |
| 10 | 1110 |
| 11 | 1111 |

The Load Byte Merge Mask controls the Byte Merge 30. A '1' indicates that this byte from memory 20 should replace this byte from Register 26. A '0' indicates that the byte from Register 26 should be used as is. The control logic 14 generates the Load Byte Merge Mask as shown in Table 1.

The Last Access Mask bits are used to control the Byte Merge 30 for the last access. A '1' indicates that this byte should be passed through as controlled by the Load Byte Merge Mask. A '0' indicates that a value of binary '00000000' should be passed for this byte. The control logic 14 generates the Last Access Mask bits as shown in Table 2.

TABLE 3

| | Store String | |
|---|---|---|
| LSBS | # of Bytes to Rotate Right | Store Byte Merge Mask |
| 00 | 0 | 0000 |
| 01 | 1 | 1000 |
| 10 | 2 | 1100 |
| 11 | 3 | 1110 |

TABLE 4

| | Store Strings With Only One Access | |
|---|---|---|
| # of bytes in XPCR | LSBS | Memory Mark Bits |
| 1 | 00 | 1000 |
| 1 | 01 | 0100 |
| 1 | 10 | 0010 |
| 1 | 11 | 0001 |
| 2 | 00 | 1100 |
| 2 | 01 | 0110 |
| 2 | 10 | 0011 |
| 3 | 00 | 1110 |
| 3 | 01 | 0111 |
| 4 | 00 | 1111 |

TABLE 5

| | Store Strings With More Than One Access | | |
|---|---|---|---|
| LSBS | First Mark Bits | LSBS + LSBX | Last Mark Bits |
| 00 | 1111 | 00 | 1000 |
| 01 | 0111 | 01 | 1100 |
| 10 | 0011 | 10 | 1110 |
| 11 | 0001 | 11 | 1111 |

The Store Byte Merge Mask controls the Byte Merge 60. A '1' indicates that this byte from register 56 should replace this byte from the General Purpose Register File 44. A '0' indicates that the byte from the General Purpose Register File 44 should be used as is. The control logic 14 generates the Store Byte Merge Mask as shown in Table 3.

Mark bits are sent to the Memory 20 with every store access. A '1' indicates that this particular byte should be modified in the memory 20. A '0' indicates that this byte should remain unchanged in the Memory 20. For Store String instructions which access only one word, only one set of mark bits are generated by the control logic 14 as shown in Table 4. For Store String instructions which access more than one word, the control logic 14 must compute a set of mark bits for both the first and last accesses as shown in Table 5. For all other accesses between the first and last accesses, a set of mark bits containing all '1' s is used.

Figure 2A:
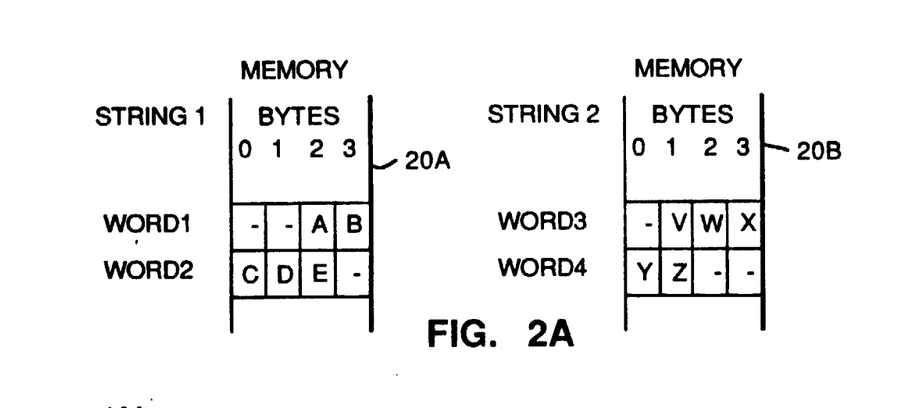
FIGS. 2A through 2D illustrate the data flow through the invention for a load string instruction.

To understand the operation of the invention, it is best to view an example of a string transfer. In FIG. 2A, the contents of memory is illustrated as word 1 and word 2 in memory 20A and word 3 and word 4 in memory 20B. Word 1 and word 2 contain the string "ABCDE". In this example, the string "ABCDE" will be transferred from the word 1 and word 2 location to the word 3 and word 4 location. Presently the word 3 and word 4 contain a second character string "VWXYZ".

Figure 2B:
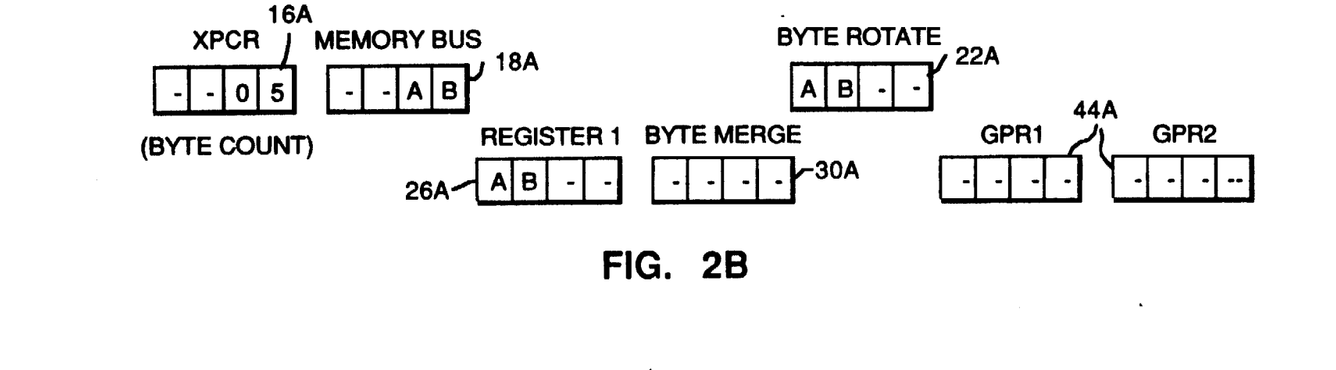

When the load string instruction is first received, the address of word 1 is computed and the contents of word 1 is fetched. This is illustrated in FIG. 2B by the contents of the memory bus in 18A. Note that the byte count has been stored in the XPCR register 16A. The contents of the word 1 are received and they are rotated left 2 bytes as illustrated by the byte rotate logic 22A. This is stored in register 26A. The byte merge logic 30A and the general purpose register 44A are unchanged.

Figure 2C:
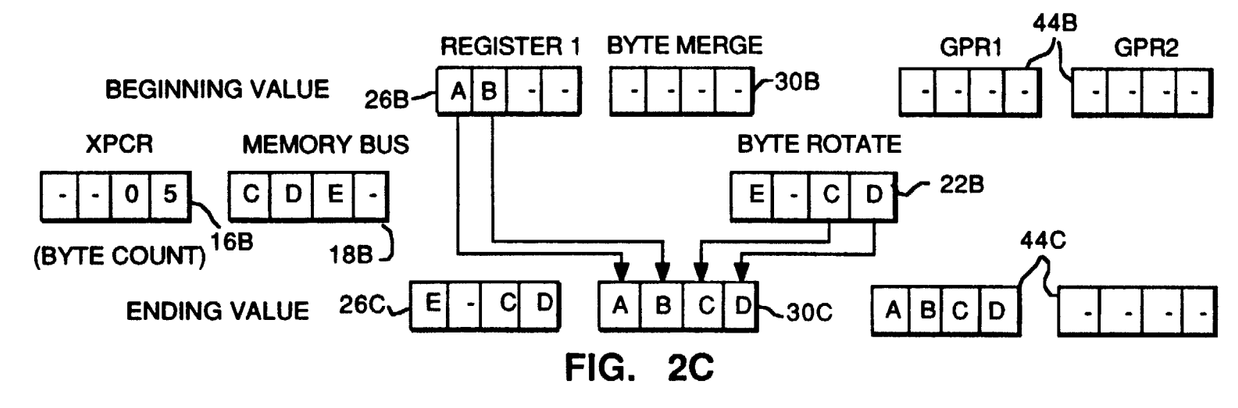
Figure 2D:
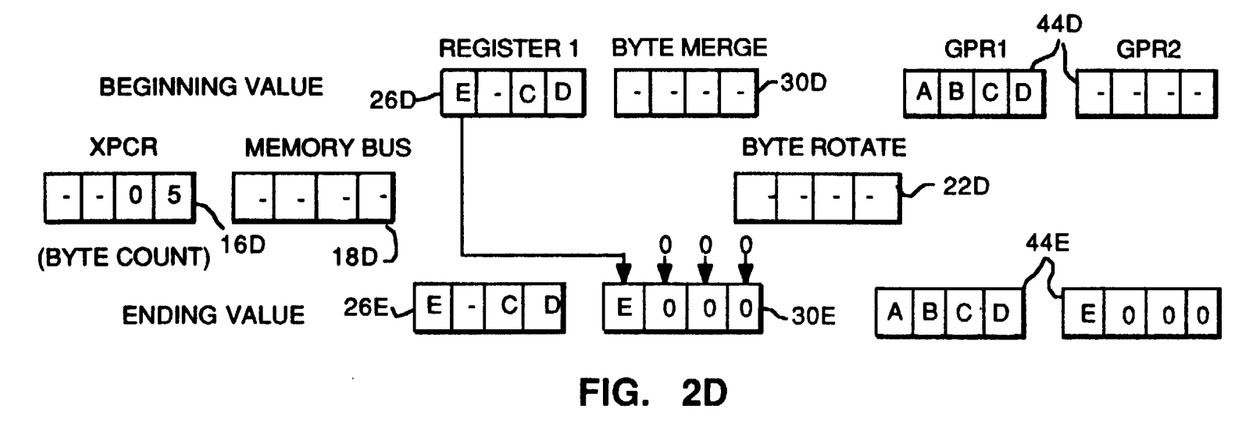

In FIG. 2C the address of word 2 is computed and then word 2 is fetched as illustrated by the memory bus 18B. The contents are then rotated left 2 bytes by the byte rotate logic 22B. A byte merge operation is then performed with the left 2 bytes of register 26B and the right 2 bytes of the byte rotate logic 22B which are output from the byte merge logic 30C as shown. The contents of the byte merge logic in 30C are then stored in the general purpose registers 44C as shown. The byte rotate logic 22B contents are stored into register 26C. Since the byte count indicates that all of the string has been fetched, the final step is to merge the remaining contents of register 26D with the remaining string. Therefore, the left most byte in register 26D is merged in the byte merge logic 30E with trailing zeros and the contents then stored in the general purpose register file 44E as shown. Note that the general purpose register file 44E includes 2 sequential registers for storing the sequence.

Figure 3A:
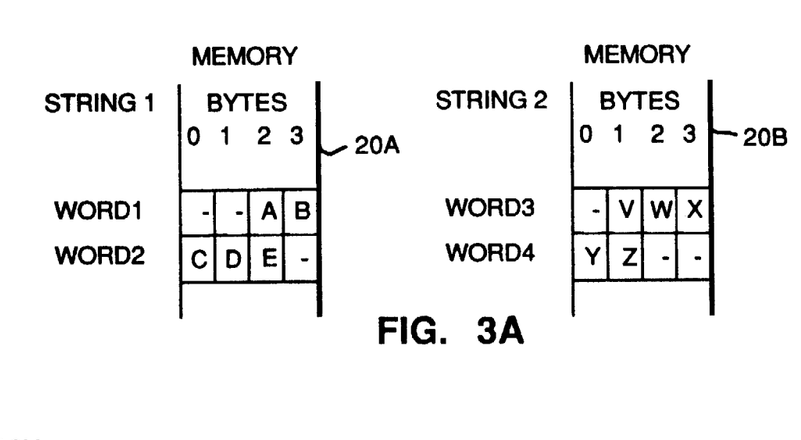
FIGS. 3A through 3D illustrate the data flow for a store string instruction.
Figure 3B:
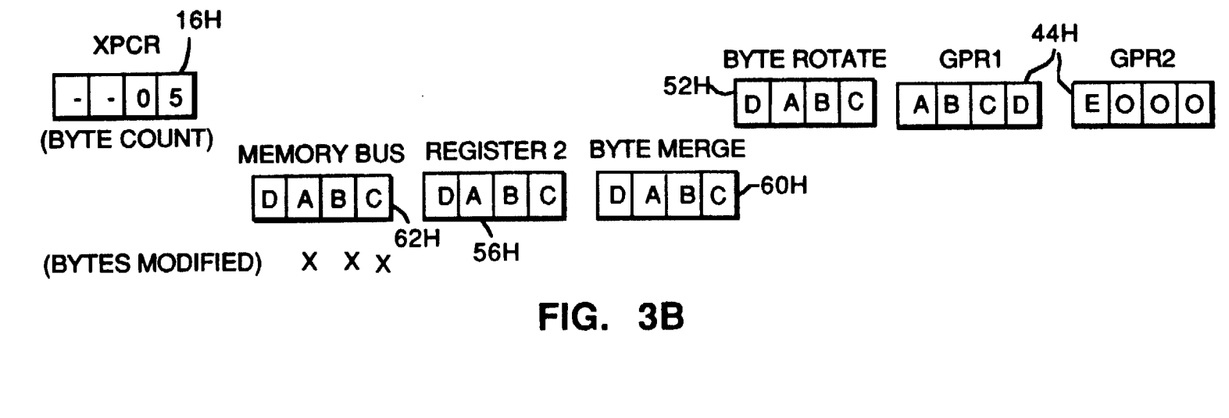

The next operation is to store the contents of the general purpose registers to memory in words 3 and words 4 (See FIG. 3A). In FIG. 3B, the count remains at 5 in the XPCR register 16H. Since the first word in memory is to contain only 3 bytes, the contents of the general purpose register containing the first 4 bytes is rotated right one byte and the memory is told to only update bytes 1, 2 and 3 (see bytes indicated for the memory bus 62H). Bus 62 (FIG. 1) includes lines that indicate to the memory 20 which bytes are to be updated.

Figure 3C:
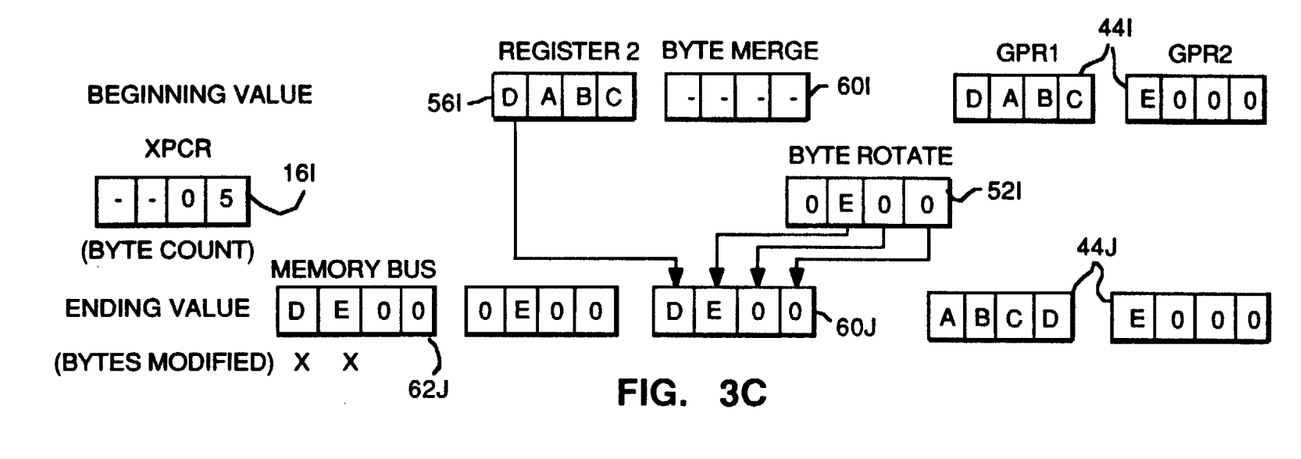
Figure 3D:
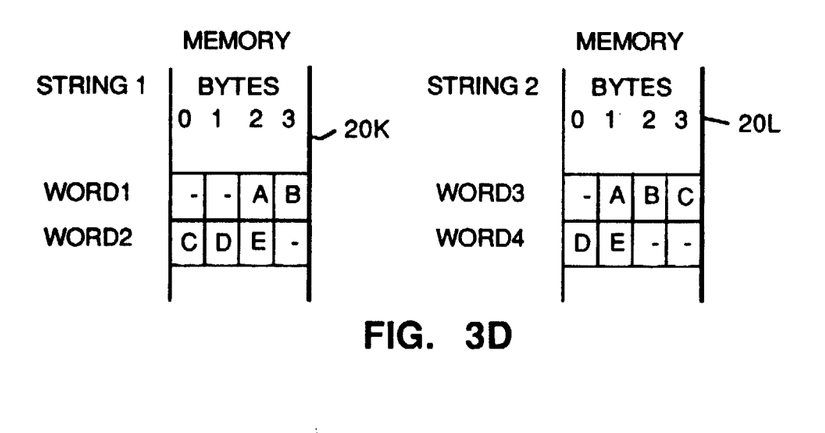

In FIG. 3C, the next word 4 is addressed and the remaining portions of the data string is merged in the byte merge logic 60J and provided onto the memory bus 62J shown modifying the bytes as indicated. the memory 20L illustrates the final transfer of the string (See FIG. 3D).

Figure 4A:
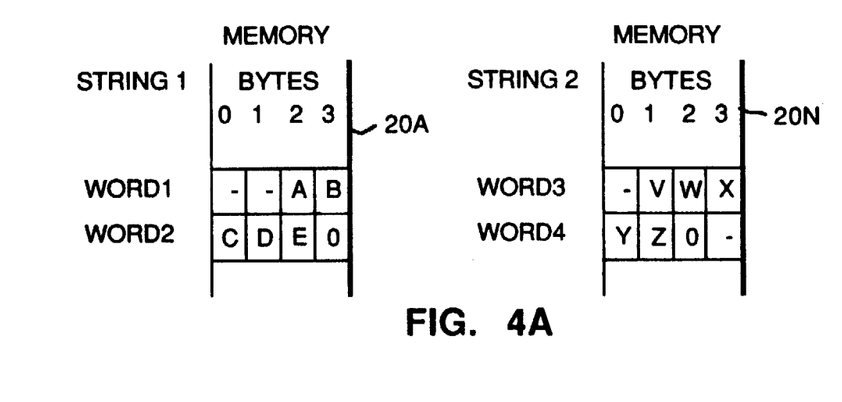
FIGS. 4A through 4D illustrates the data flow for a load string and compare byte instruction.

In the preceding example the character string was specified by a count. In the following example, the character string is specified in length by a termination character at the end of the character sequence. However, count register 16 must be loaded with a count larger than the actual string itself. The load string and compare byte instruction is then executed where the byte that is being compared is the terminal character. In FIG. 4A, the memory, 20 contains the string to be transferred consisting of the character string "ABCDE" and the termination character "0". This character string will be transferred from words 1 and 2 in memory 20M to words 3 and 4 in memory 20N.

Figure 4B:
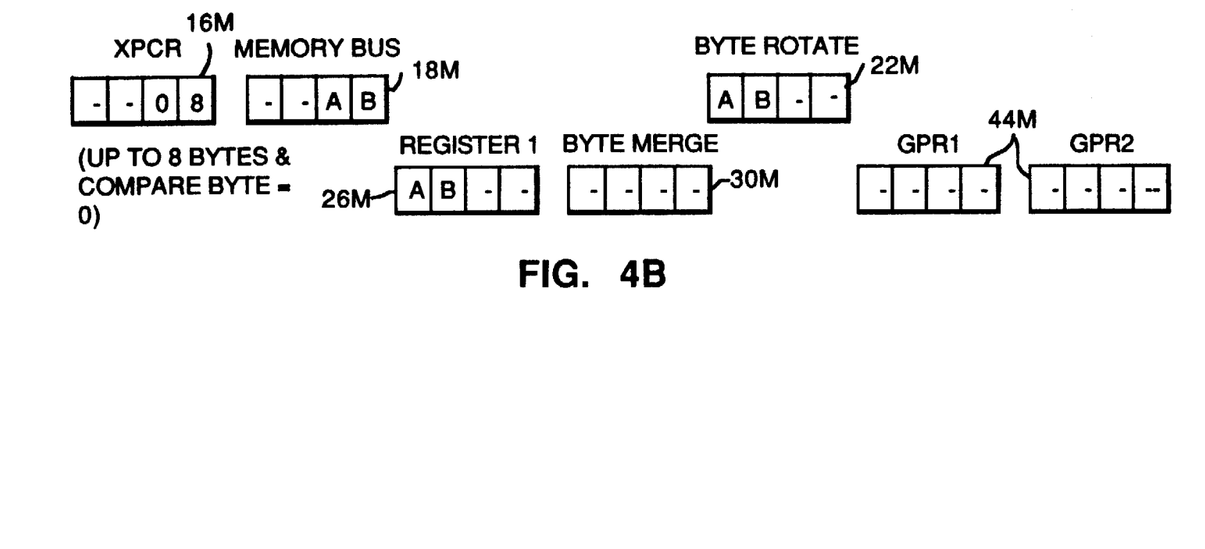

In FIG. 4B, the fixed point count register 16M is loaded with the number 8 (which is larger than the 6 bytes to be transferred). The address for word 1 is then computed and the contents of word 1 are accessed on memory bus 18M. This contents are rotated two bytes to the left in byte rotator logic 22M and stored in register 26M as shown.

Figure 4C:
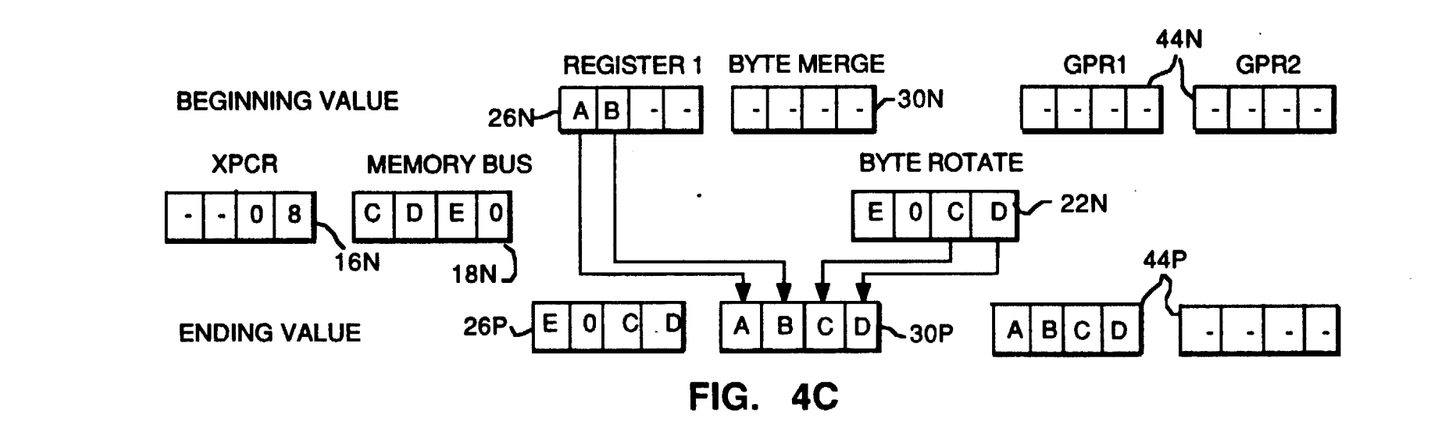
Figure 4D:
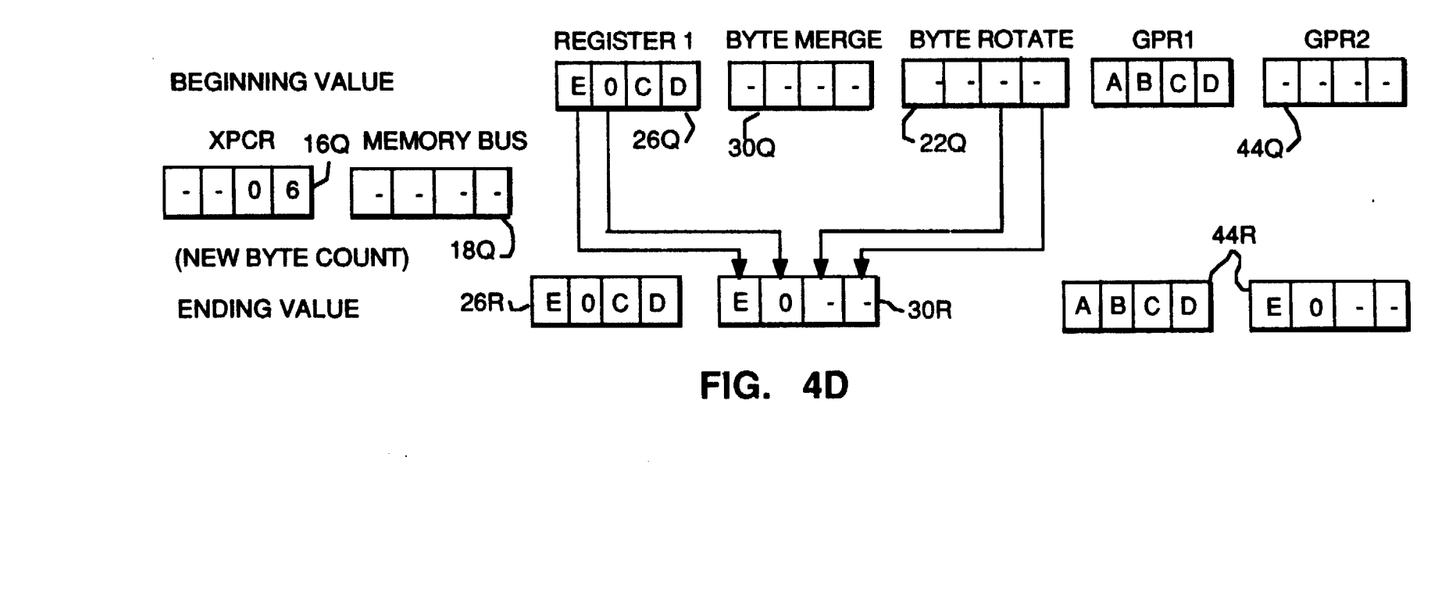

In FIG. 4C, word 2 is fetched from memory as shown in memory bus 18N and again is rotated 2 bytes to the left as illustrated in the byte rotate logic 22N. The left 2 bytes of register 26N are merged with the right 2 bytes of the byte rotator logic 22N in the byte merge logic 30P. The byte merge logic contents 30P are stored in the general purpose register 44P. Register 26P now contains the previous contents of the byte rotate logic 22N. The last step merges the contents of register 26Q (left 2 bytes) with the right 2 bytes of the byte rotator logic 22Q in the byte merge logic 30R. The count in the fixed point count register 16Q has been updated since a positive comparison to the termination character was made. The contents of the byte merge logic 30R are then stored into the general purpose registers the general purpose registers as shown in 44R.

Figure 5A:
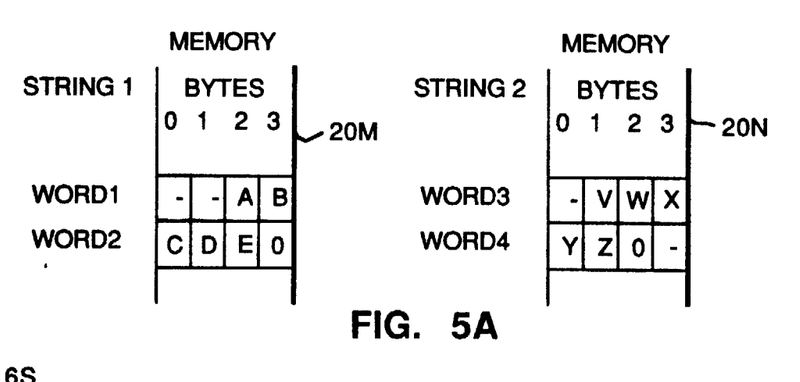
FIGS. 5A through 5D illustrate the data flow for a store string instruction for a null terminated character string.
Figure 5B:
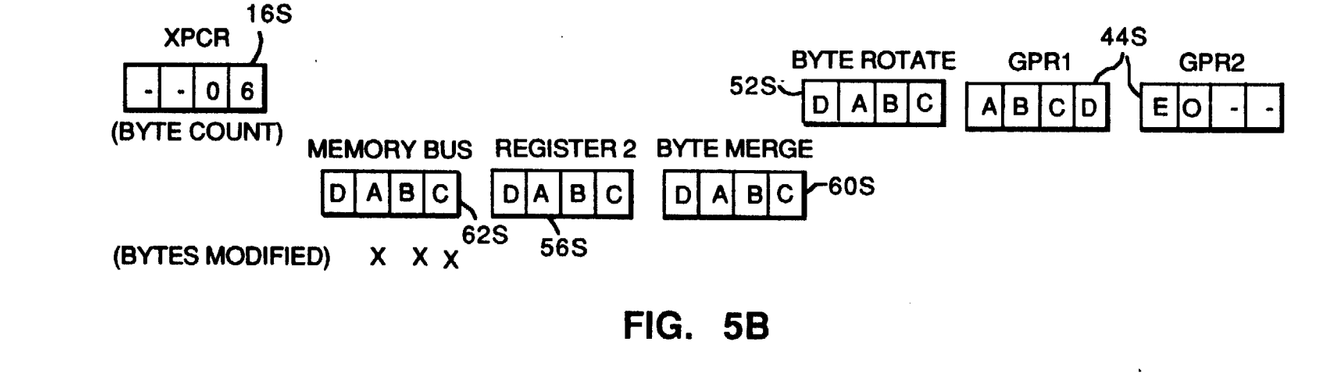

Again, FIGS. 5A through 5D illustrate the storage of the general purpose register containing the string, terminated by the null character, to the memory location 20N. In FIG. 5B, the contents of the general purpose register 44S containing the first 4 bytes is rotated 1 byte to the right. This contents is then placed in register 56S to the byte merge logic 60S. The 3 bytes indicated on the memory bus 62S are updated.

Figure 5C:
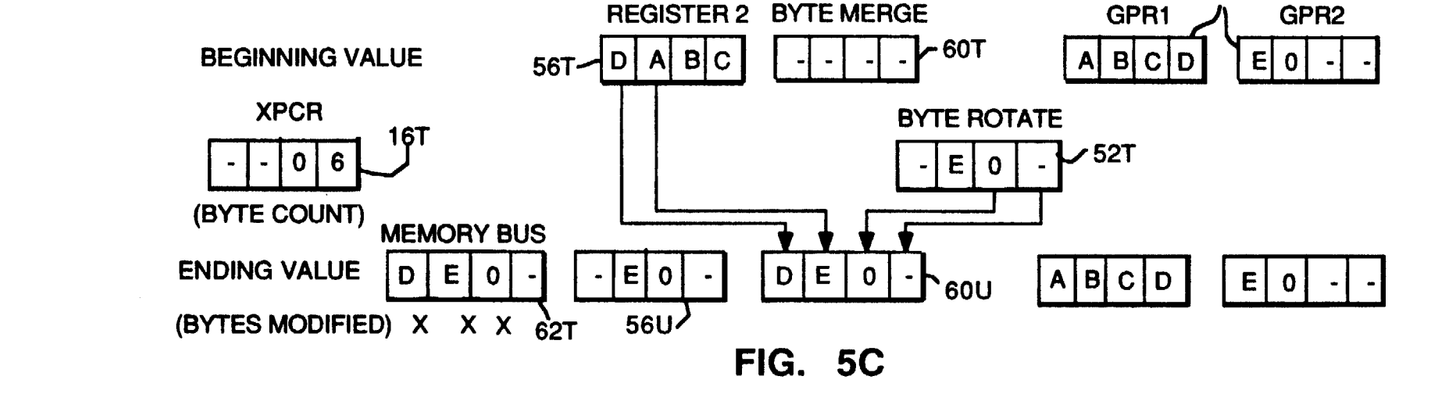
Figure 5D:
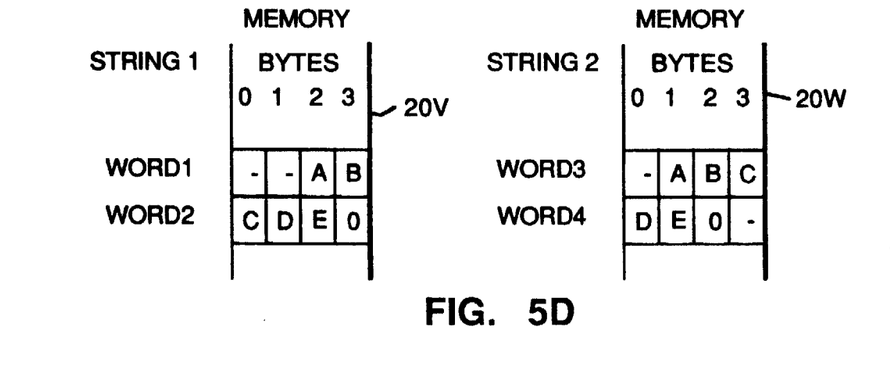

In FIG. 5C, the contents of register 56T are then merged with the remaining sequence in the byte rotate logic 52T to form the contents of the byte merge logic 60U which is placed on the memory bus 62T to update the bytes as indicated. This results in the transfer of the character string to the memory location 20W in FIG. 5D.

Figure 6:
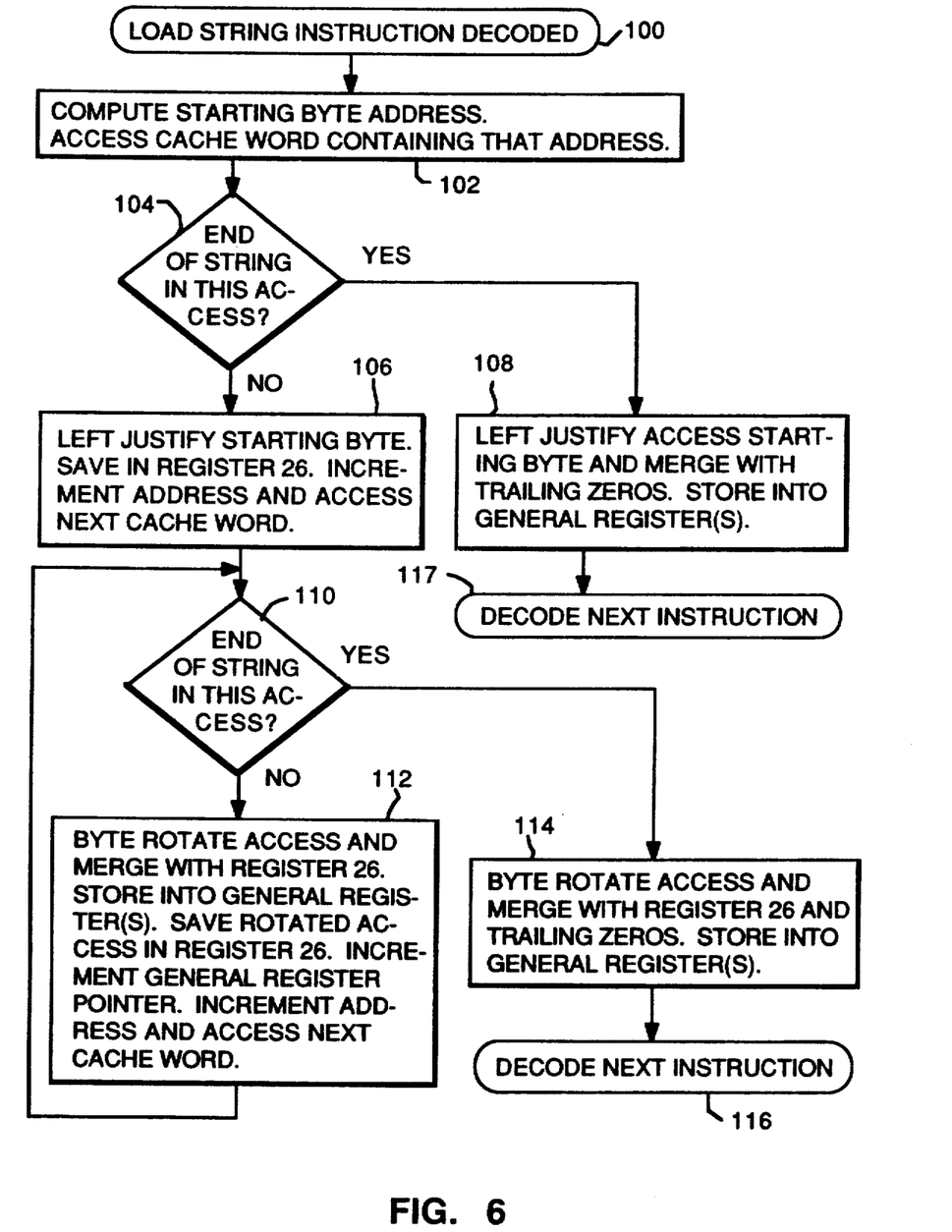
FIG. 6 is a flow diagram for the load string instruction.

FIGS. 6 illustrates a flowchart for the load string instruction. The load string instruction is first decoded in Step 100. In Step 102, the starting byte address is computed. This includes accessing the cache or memory word that contains that byte address. In Step 104, determination is made as to whether the string has been terminated. If not, in Step 106 the starting byte is left justified and stored in the register 26, the address is incremented and the next word is fetched. In Step 110, again it is determined whether the end of the string has been encountered. If not, in Step 112, the byte rotate operation is performed and the newly fetched bytes are merged with the previously fetched bytes in the register 26. The merge contents is then stored to the general purpose register 44. The rotated contents are then saved in the register 26. The general purpose register pointer 46 is incremented, the address is then incremented and the next word fetched. Returning to Step 108, the end of the string has been accessed, the starting byte is left justified and the last bytes merged with trailing zeros. The contents are then stored in the general purpose register. In Step 117, the next instruction is decoded. Returning to Step 114, again when the end of string has been accessed, the contents of the memory bus are rotated and merged with trailing zeroes and the contents in the merge logic are stored in the general purpose register. The process then proceeds to the next instruction in Step 116.

Figure 7:
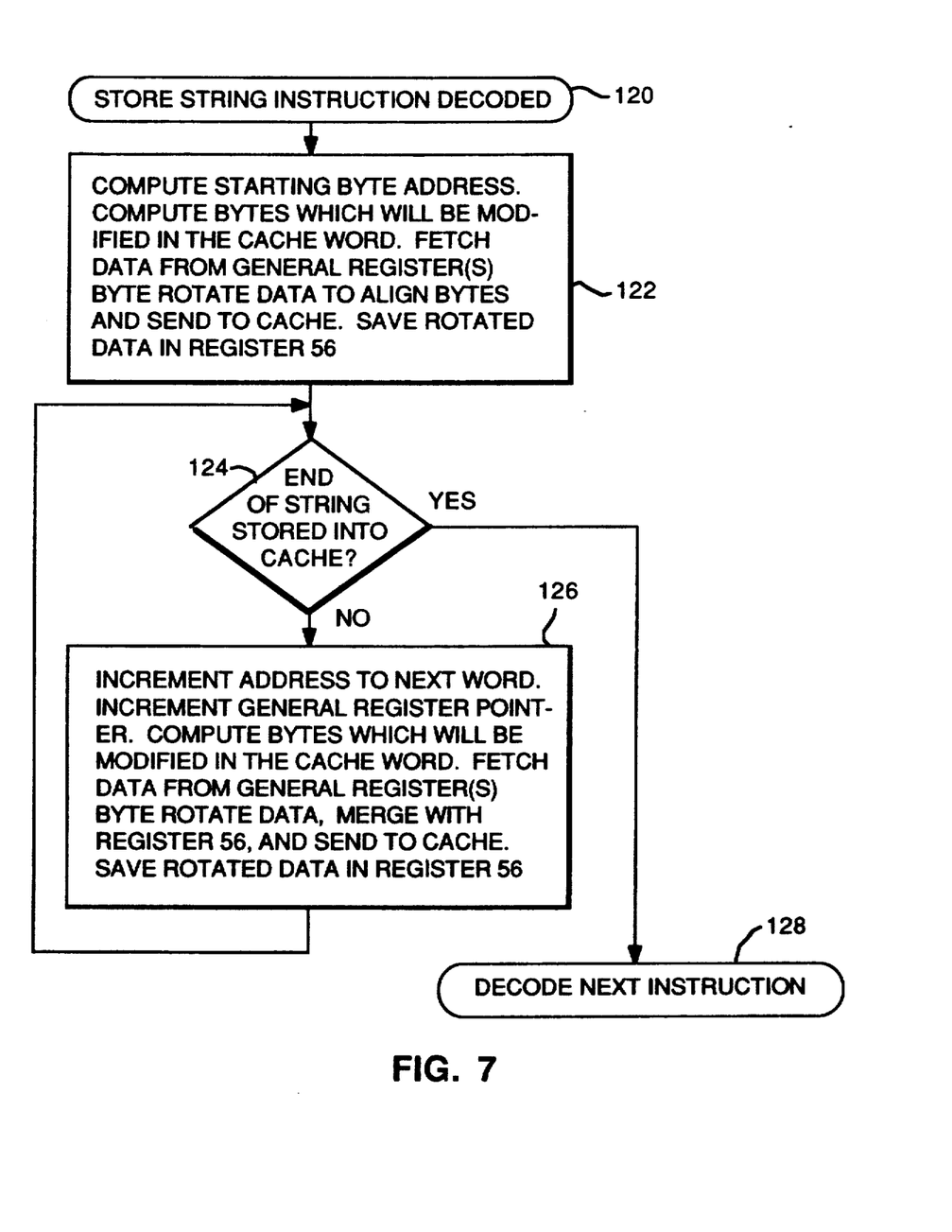
FIG. 7 is a flow diagram for the storage string instruction.

FIG. 7 illustrates the store string instruction. The store string instruction is decoded in Step 120. In Step 122, the starting byte address is then computed. From this it is determined the bytes that will be stored in the modified memory word. These data is fetched from the general purpose registers 44 and rotated to align the bytes in their appropriate positions. These bytes are sent to memory with an indication to memory to modify the specific bytes. The rotated data is saved in the register 56. In Step 124, it is determined whether the end of the string is being encountered. If not, in Step 126, the address for the next word is incremented, the general purpose pointer is incremented, and the number of bytes to be updated is then computed. Data is fetched from the general purpose registers 44, rotated and merged and provided to memory. The rotated contents is then saved in the register 56. When the end of the string is encountered, the process proceeds to Step 128 to decode the next instruction.

Figure 8:
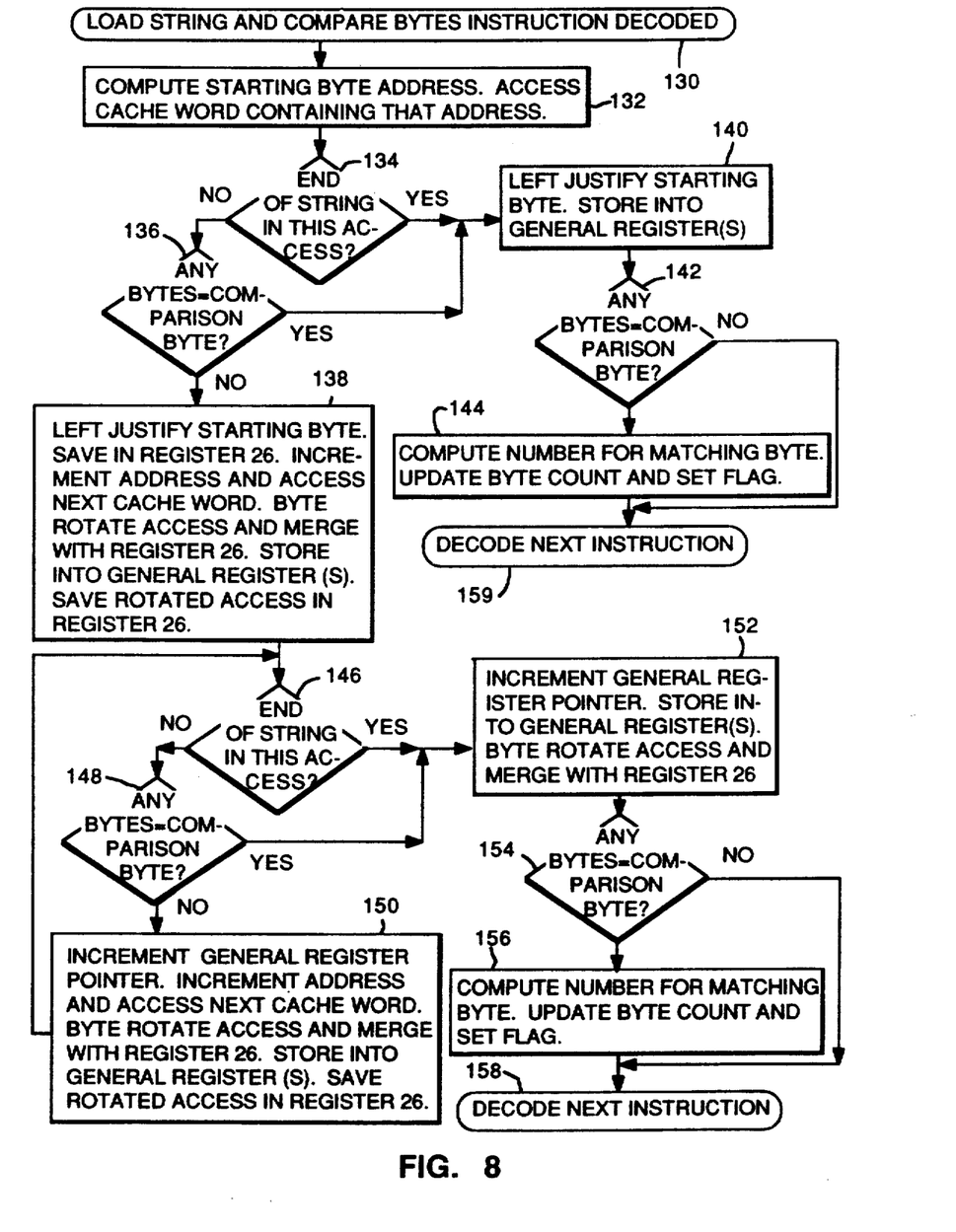
FIG. 8 is a flow diagram for the load string and compare byte instruction.

FIG. 8 illustrates the load string and compare byte instruction. In Step 130, load string and compare byte instruction is decoded. In Step 132, the starting address of the byte is computed and the word containing this byte is accessed. In Step 134, it is determined whether the end of the string has been encountered. If not, in Step 136, it is determined if any of the bytes are equivalent to the comparison byte. If not, in Step 138, the starting byte is left justified and then saved. The address is incremented and the next word is accessed. The byte rotate and merge function are performed and the contents are stored in the general purpose registers 44. The rotated contents are then saved in register 26. In Step 146, it is again determined whether the end of the string has been accessed. If not, in Step 148, it is determined if any of the bytes are equivalent to the comparison byte. If not, in Step 150, the general purpose register pointer 46 is incremented, the byte address is incremented and the next word is accessed from memory. The byte rotate and merge operations are performed with contents stored in the general purpose registers 44. The rotated contents are stored register 26. Returning to Step 140, the starting byte is left justified and stored in the the general purpose registers 44. In Step 142, it is determined if any of the bytes are equivalent to the comparison byte. If so, the process computes the number of the first matching byte and then updates the byte count and flag accordingly. The process proceeds to the Step 159, to decode the next instructions.

Returning to Step 152, the general purpose register pointer 46 is incremented and the byte rotate and merge operations are performed with contents stored in the general purpose registers 44. In Step 154, it is determined whether any of the bytes are equivalent to the comparison byte. If so, in Step 156, the number of the first matching byte is computed, the byte count changed and flag set. In Step 158, the next instruction is decoded.

Figure 9A:
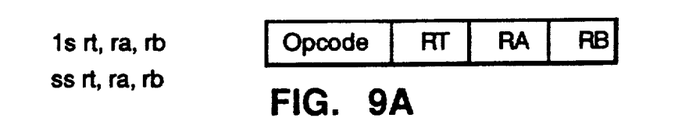
FIG. 9A is an illustration of the load string and store string operational code format.
Figure 9B:
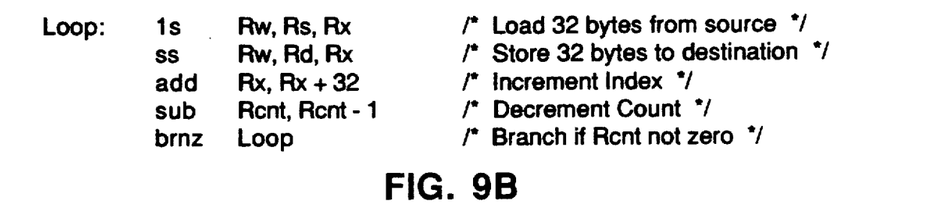
FIG. 9B is an example of a character string transfer operation where the character string is specified by byte count.

FIG. 9A illustrates the format for the load string and store string instruction. These string instructions can be used to perform rapid string moves by being coded in a small loop. The address of the starting byte of the string is computed by adding general purpose register RA + RB. For load string "ls", the string is loaded starting with register RT, then RT + 1, and so on until the end of the string. For the store string instruction "ss", the string is stored starting with register RT, then RT + 1, and so on until the end of the string. The length of the string is contained in the register called the Fixed Point Control Register (XPCR). For example, if the XPCR is loaded with the count of 32 bytes, a counter can be established that represents the number of 32 byte blocks which will be moved and be placed in register Rcnt. The starting address of the source string is in Rs and the starting address of the destination string is in register Rd. Eight working registers are required for 32 bytes (Rw − Rw + 7). Register Rx contains the current index value starting at zero. The loop for moving the string is illustrated in FIG. 9B.

Figure 9C:
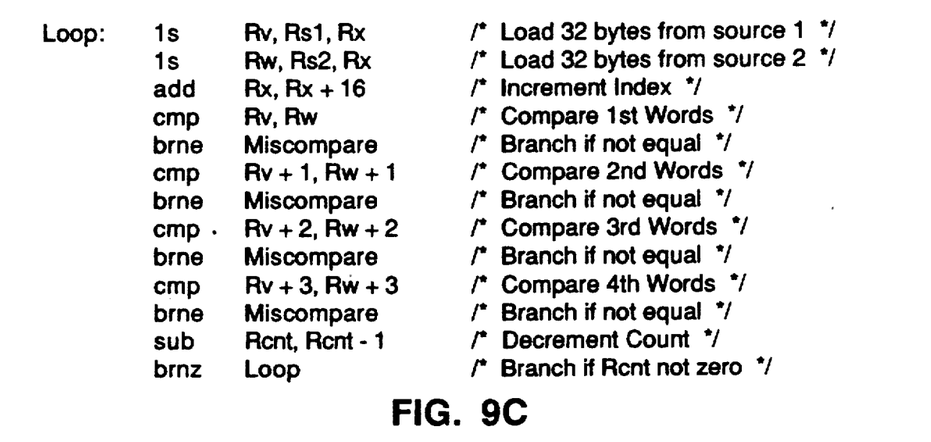
FIG. 9C is an example of instructions for performing a word by word compare operation.

Because the ls (load string) instruction pads the registers with zeroes past the end of the string, this instruction can be used to perform string comparisons in which the comparison occurs a word at a time. If Rs1 and Rs2 are the starting addresses of the 2 strings and Rv is another set of working registers, the loop illustrated in FIG. 9C will perform this function.

Figure 9D:
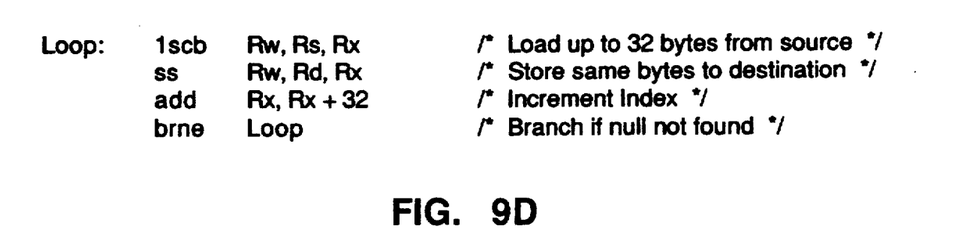
FIG. 9D is an example of a byte comparison operation using the load string and compare byte construction.

For null terminated strings (as in the language C), the Load String and Compare Bytes "lscb" instructions can be used. The byte to be compared with is in a different field within the XPCR. Since lscb instructions update the byte content field in the XPCR to the number of the matching bytes, the store string instruction which follows it will only store up to and including the null character. The register usage is as described above except that Rcnt is not needed since the length of the string is determined by the location of the null character. Assuming the XCPR is loaded with the null character and the byte count is 32, the loop to accomplish the function is illustrated in FIG. 9D.

Although the invention has been described with reference to the specific embodiment, this description is not meant to be construed in a limiting sense. Various modifications of the disclosed embodiments, as well as other embodiments of the invention, will become apparent to those persons skilled in the art upon reference to this Best Mode for Carrying Out the Invention. It is, therefore, contemplated that the appended claims will cover any such modifications or embodiments as may fall within the true scope of the invention.

I claim:

1. In a data processing system configured to transfer data in words, an apparatus for manipulating data stored in bytes, said apparatus comprising:
   a) instruction decoding means for decoding instructions including a single data manipulation instruction for manipulating a contiguous variable length and longer than a word sequence of data stored in bytes and providing a command signal in response to the single manipulation instruction;
   b) memory means for storing data as addressable words, each word including a plurality of bytes;
   c) means in response to a command signal from said instruction decoding means for accessing said contiguous variable length sequence of bytes from said memory means, a first byte of said sequence stored in said memory means on a non-word boundary; and
   d) means for providing said sequence to a plurality of data processing registers, said first byte of the sequence aligned on a first register boundary, said providing means including:
      i) means for altering locations of bytes in the byte sequence; and
      ii) means for comparing bytes in the sequence with a predetermined byte; and
   e) means for storing said byte sequence in said data processing registers to said memory means by updating individual byte locations in said memory means, said means for storing said byte sequence including means for storing a predetermined byte in the trailing byte locations in the last word of the byte sequence in the register means.

2. A data processing system according to claim 1 wherein said byte sequence includes either a predefined byte character specifying sequence termination or a count specifying the number of bytes in the sequence.

3. A data processing system according to claim 2 wherein said instruction specifies a first data processing register of a sequence of data processing registers and said apparatus includes means for storing said byte sequence in said first data processing register and remaining registers in the data processing register sequence.

* * * * *